US012491729B2

(12) United States Patent
Massad et al.

(10) Patent No.: US 12,491,729 B2
(45) Date of Patent: Dec. 9, 2025

(54) WET PALETTE FOR WATER-BASED PAINT

(71) Applicant: Redgrass SA, St-Sulpice (CH)

(72) Inventors: Fabrice Massad, St-Sulpice (CH); Vivien Massad, Préverenges (CH)

(73) Assignee: Redgrass SA, St-Sulpice (CH)

(*) Notice: Subject to any disclaimer, the term of this patent is extended or adjusted under 35 U.S.C. 154(b) by 128 days.

(21) Appl. No.: 18/276,975

(22) PCT Filed: Dec. 7, 2021

(86) PCT No.: PCT/IB2021/061397
§ 371 (c)(1),
(2) Date: Aug. 11, 2023

(87) PCT Pub. No.: WO2022/175740
PCT Pub. Date: Aug. 25, 2022

(65) Prior Publication Data
US 2024/0116308 A1 Apr. 11, 2024

(30) Foreign Application Priority Data
Feb. 17, 2021 (CH) .................................... 00155/21

(51) Int. Cl.
*B44D 3/02* (2006.01)
*B65D 1/34* (2006.01)
*B65D 43/02* (2006.01)

(52) U.S. Cl.
CPC ................ *B44D 3/02* (2013.01); *B65D 1/34* (2013.01); *B65D 43/0202* (2013.01); *B65D 2543/00194* (2013.01)

(58) Field of Classification Search
CPC ...... B65D 2543/00194; B65D 43/0202; B65D 1/34; B44D 3/02; B44D 3/00; B44D 3/04
(Continued)

(56) References Cited

U.S. PATENT DOCUMENTS 2,932,906 A * 4/1960 Chamberlin ............. B44D 3/04 434/167
3,874,499 A 4/1975 Barnett, Jr.
(Continued)

FOREIGN PATENT DOCUMENTS

CN 202106787 U 1/2012
CN 206012194 U 3/2017
JP 2019026978 A 2/2019

OTHER PUBLICATIONS

Wikipedia; Coated Paper; Feb. 17, 2022; 3 pages; https://en.wikipedia.org/w/index.php?title=Coated_paper&oldid=997363633.
(Continued)

*Primary Examiner* — Chun Hoi Cheung
(74) *Attorney, Agent, or Firm* — Taft Stettinius & Hollister LLP

(57) ABSTRACT

A wet palette for water-based paint that includes a flat container having a peripheral rim and which, in its operational state, contains water. A retaining structure for the water, preferably a sponge or a foam, is placed in the flat container and arranged to become impregnated and moisten by contact and absorption of the water contained in the flat container. A sheet of paper permeable to the water is positioned on the retaining structure, and, in its operational state, is in contact with water-based paint applied to an upper side of the sheet of paper. The sheet of paper is a sheet of one-side coated (C1S) paper, which is wet-strengthened (REH), namely a sheet of machine-finished coated (MFC) paper or a sheet of cast-coated paper, the coated upper side of which is exploited, in its operational state, as a support for the application of the water-based paint.

14 Claims, 1 Drawing Sheet

(58) Field of Classification Search
USPC .................................................... 206/1.7–1.9
See application file for complete search history.

(56) References Cited

U.S. PATENT DOCUMENTS

| | | | | | |
|---|---|---|---|---|---|
| 3,885,843 | A * | 5/1975 | Rubel | B44D 3/00 | 312/231 |
| 4,444,306 | A * | 4/1984 | Benaquista | B44D 3/02 | 206/204 |
| 5,715,933 | A | 2/1998 | Monahan | | |
| 6,302,267 | B1 | 10/2001 | Monahan | | |
| 9,656,513 | B2 * | 5/2017 | Mayberry | B44D 3/02 | |
| 2007/0247711 | A1 * | 10/2007 | Ohtani | B05D 3/067 | 359/488.01 |
| 2008/0078681 | A1 * | 4/2008 | Newman | B65D 73/005 | 29/428 |
| 2010/0310894 | A1 * | 12/2010 | Wicher | D21H 17/28 | 428/537.5 |
| 2013/0276772 | A1 * | 10/2013 | Ota | B32B 5/16 | 428/305.5 |

OTHER PUBLICATIONS

Feldmuehle; SaxaSet; Sep. 1, 2017; 1 page; www.feldmuehle-uetersen.com.
Chromolux; Chromolux 900 E; Aug. 2015; 1 page; joerg.neuhaeuser@zanders.com.
International Search Report; European Patent Office; International Application No. PCT/IB2021/061397; Mar. 7, 2022; 8 pages.
Written Opinion of the International Searching Authority; European Patent Office; International Application No. PCT/IB2021/061397; Mar. 7, 2022; 12 pages.

* cited by examiner

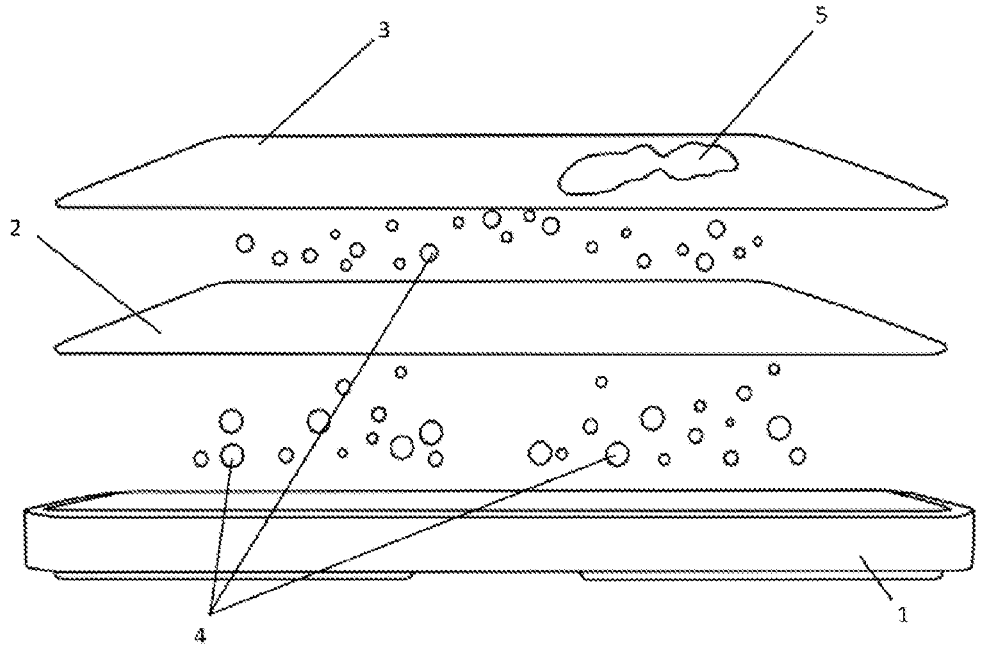
3
5
2
1
4

WET PALETTE FOR WATER-BASED PAINT

CROSS REFERENCE TO RELATED APPLICATIONS

This application is a U.S. national stage filing of International Patent Application No. PCT/IB2021/061397 filed Dec. 7, 2021, which claims priority to Swiss Application No. 00155/21 filed Feb. 17, 2021, the contents of each application are hereby incorporated by reference in their entirety.

TECHNICAL FIELD

The present invention relates to a wet palette for water-based paint (hereinafter referred to as a "wet palette") which aims to prolong the life of a water-based paint during a painting session. or between painting sessions.

TECHNOLOGICAL BACKGROUND

In general, a wet palette includes a box comprising a foam or sponge saturated with water which, by capillarity, passes through a sheet of paper, for example greaseproof paper, on which paint is positioned. The paint is then kept wet "in the open" during the painting session but also between painting sessions with a lid. Such a solution, in accordance with the preamble of claim 1, is for example described in U.S. Pat. No. 5,715,933 A or in U.S. Pat. No. 6,302,267 B1, the teaching of which is incorporated herein by reference.

U.S. Pat. No. 3,874,499 A discloses, with reference to FIGS. 1 to 8 thereof, various embodiments of an artist's palette which maintains water-based paints in a fresh, workable condition during use or storage. This palette includes a palette surface that provides a controlled amount of moisture to the paints applied thereon. A specific structure is provided, which comprises a palette base member having a textured surface, supplied with water by means of a reservoir placed above the textured surface, and a cover sheet covering the major part of the textured surface. This cover sheet comprises an absorbent lower side, placed in contact with the textured surface, and a treated upper side, which is permeable to water, but substantially impermeable to the pigments of the water-based paints which are applied to the cover sheet. Water supplied to the textured surface from the reservoir passes by capillary action from the textured surface to the cover sheet and permeates the cover sheet to maintain a moisture level of the water-based paints. The cover sheet may in particular consist of a permeable and water-resistant wallpaper, the upper surface of which is treated with a material which is permeable to water and which prevents the permeation of the pigments contained in the water-based paints. In this case, an aqueous latex-based polymer emulsion is used to treat the upper surface of the cover sheet, which emulsion is applied in liquid form to form, after drying, a uniform layer on the upper surface of the cover sheet.

The solution described with reference to FIGS. 1 to 8 of U.S. Pat. No. 3,874,499 A does not therefore rely on the use of a wet palette comprising a water-retaining structure which is placed in a container filled with water and which becomes impregnated and moistens on contact with water, but on the use of a reservoir which must constantly supply water to the textured surface. This configuration is not adequate insofar as the water supply of the whole of the textured surface cannot be ensured in a uniform manner. This solution further requires that the cover sheet consisting of wallpaper be moistened beforehand before being placed on the textured surface, in particular by saturating the cover sheet with water on both sides using a damp sponge or running it under a faucet. The configuration of this palette is thus made more complex and its use more tedious and not very optimal.

U.S. Pat. No. 3,874,499 A also describes, with reference to FIG. 9 thereof, another embodiment of an artist's palette which does not require a reservoir supplying a textured surface at the base of the cover sheet. According to this other embodiment, the reservoir and the textured surface are replaced by a water-retaining base structure, formed of a rigid water-absorbent material, which base structure is treated or coated on its bottom and its side edges with a waterproof material to contain water inside the base structure. This other palette is used by supplying water beforehand to the base structure, through its upper face, and distributing the water inside the base structure, before applying the preliminarily moistened cover sheet on the upper face of the base structure.

The solution described with reference to FIG. 9 of U.S. Pat. No. 3,874,499 A does not therefore rely on the use of a wet palette comprising a water-retaining structure which is placed in a container filled with water and which becomes impregnated and moistens on contact with water, but on the use of a base structure combining the functions of container and water-retaining structure. Such a base structure, moreover rigid, turns out in fact to be too complex and expensive to produce, which is not desirable, especially since it is necessary to periodically replace the water-retaining structure.

The use of a wallpaper as described in U.S. Pat. No. 3,874,499 A proves in any event to be unsuitable in practice, this type of paper having too high a grammage, typically exceeding 120 $g/m^2$ and possibly approaching or even exceeding 200 $g/m^2$. As discussed above, the use of such a wallpaper therefore requires the cover sheet to be moistened beforehand and saturated with water, before being able to apply the paint to the surface of this cover sheet, which makes its application not easy in practice.

The problem of the solutions of the state of the art comprising a water-permeable paper are multiple and depend on the papers used, which may have one or more of these defects. Laying of the paper on the wet surface is difficult and very often the sheet of paper warps because the fibers of the paper in contact with the water relax.

In addition, relatively fragile, the paper ends up degrading to produce small pieces of paper debris, like fine dust.

Depending on the paint, especially for very thin paint, "swirling" the paint will cause it to penetrate the paper causing the wet layer to stain. In addition to losing paint, the sponge or foam is stained and, the paper being slightly transparent, the work surface is therefore partially soiled and becomes unusable, making the paper difficult to clean and re-use. These papers therefore lead to overconsumption of paint, difficulty in cleaning and reusing these papers, and degradation of sponges and foams.

Depending on the papers used, in particular greaseproof papers, the paint or water tends to gather on the surface, making mixing and use of the palettes difficult. This is due to too low surface energy.

SUMMARY OF THE INVENTION

An object of the present invention is to provide a wet palette capable of keeping the paint wet the longest during a painting session and also between painting sessions.

Another object of the present invention is to prevent the sheet of paper exploited as moistening support from deteriorating, which would alter the quality of the paint.

Yet another object of the invention is to prevent the paint and the pigments contained in the paint (in particular the finer ones) from penetrating into the sheet of paper, so as to make it more robust in use, or even to allow and facilitate its cleaning, if necessary, and its reuse in the best conditions.

An additional object of the invention is to provide a wet palette which also makes it possible to work with thin layers of paint.

In accordance with the invention, the wet palette for water-based paint comprises a flat container having a peripheral rim and which, in its operational state, contains water, a retaining structure for the water, preferably a sponge or a foam, which retaining structure is placed in the flat container and arranged to become impregnated and moisten by contact and absorption of the water contained in the flat container, and a sheet of paper permeable to the water, positioned on the retaining structure, and which, in its operational state, is in contact with water-based paint applied to an upper side of the sheet of paper. A lid can be added and placed on the flat container, thus enclosing the retaining structure as well as the sheet of paper in order to preserve the paint between various painting sessions.

According to the invention, the sheet of paper is a sheet of one-side coated paper—or "C1S" paper ("coated one side")— which is wet-strengthened ("résitant à l'état humide", or "REH", in French terminology), paper which is normally used for labeling, in particular of glass or metal containers, and whose coated upper side is exploited, in its operational state, as a support for the application of water-based paint.

A variety of papers are commercially available which include varying degrees of water absorption and wet strength (REH). The Applicant has conducted multiple tests in this regard using various types of papers, and wet-strengthened (REH), one-side coated (C1S) papers are found to be optimal candidates for application within the framework of the invention due in particular to their good ability to absorb water (on the uncoated side), their good wet strength (REH), the adequacy of the level of water permeability of the coating, and their good degree of impermeability to the pigments usually contained in water-based paints. As mentioned above, wet-strengthened, one-side coated (CIS) papers are usually used for labeling operations, in particular of glass or metal containers, for example for labeling glass bottles. In this context, the underside of these coated papers is not normally exposed to the environment, but typically coated with an adhesive allowing the application and adhesion of the paper to the container to form labels. To the Applicant's knowledge, the use of this particular type of paper in the context of a wet palette, namely as moistening support, has not been envisaged until now, even less described or suggested in the state of the art.

According to the invention, the sheet of one-side coated (C1S) paper is more particularly a sheet of machine-finished coated paper, or "MFC" paper, or a sheet of cast-coated paper, or "coated on chrome" paper, namely a paper whose coating is carried out by means of a polished chrome-plated cylinder which gives the coating greater shine and a smooth surface.

In accordance with a preferred embodiment, the sheet of one-side coated (C1S) paper has a grammage defined according to ISO standard 536 which is comprised between 30 g/m$^2$ and 100 g/m$^2$, preferentially between 50 g/m$^2$ and 100 g/m$^2$.

Wet strength (REH) can be imparted to the paper during its manufacture by the addition of reinforcing fibers or by an appropriate treatment which makes it possible to prevent tearing and disintegration of the sheet of paper in water.

In one embodiment, the sheet of one-side coated (C1S) paper is preferably a sheet of wood-free paper, which makes it possible to prevent any yellowing of the paper.

Even more preferably, the sheet of one-side coated (C1S) paper has a COBB60 absorption index measured according to ISO standard 535 on the side of its lower side which is between 10 g/m$^2$ and 25 g/m$^2$, as well as a dry tensile strength measured according to ISO standard 1924-2 which is between 50 N/15 mm and 100 N/15 mm.

In one embodiment, the water-retaining structure is a smooth foam or smooth sponge, in particular a polyvinyl alcohol (PVA) foam or a polyurethane foam, which has the required characteristics such as high absorption capacity, smooth surface limiting the development of molds.

The wet palette according to the invention can be used just as well with acrylic paint, gouache or any other type of water-based paint, such as watercolor.

There is also claimed the use of a sheet of one-side coated (C1S) paper, which is wet-strengthened (REH), namely a sheet of machine-finished coated (MFC) paper or a sheet of cast-coated paper, as moistening support of a wet palette for water-based paint, the coated side of said sheet of one-side coated paper being exploited, in its operational state, as a support for the application of water-based paint, in particular acrylic paint, gouache, or watercolor. This sheet of one-side coated (C1S) paper may preferably have the additional features listed above.

The invention also relates to a method of implementing a wet palette for water-based paint, in particular a wet palette according to the aforementioned embodiments, comprising the following steps:

- pouring water into a flat container having a peripheral rim then placing a retaining structure for the water, preferably a sponge or foam, in the flat container, or vice versa, the retaining structure becoming impregnated and moistening by contact and absorption of the water contained in the flat container;
- placing a sheet of paper permeable to the water on said retaining structure, the sheet of paper being a sheet of one-side coated (C1S) paper, which is wet-strengthened (REH), namely a sheet of machine-finished coated (MFC) paper or a sheet of cast-coated paper, the coated upper side of which is exploited as a support for the application of water-based paint; and
- applying the water-based paint on the coated upper side of the sheet of paper.

Other aspects of the invention are explained in the remainder of this description.

BRIEF DESCRIPTION OF THE DRAWINGS

The features and advantages of the invention will appear more clearly on reading the following detailed description of embodiments of the invention, which are presented solely by way of non-limiting examples and are illustrated by the appended drawings where the FIG. 1 shows an exploded view of a wet palette according to the present invention.

EMBODIMENTS OF THE INVENTION

As illustrated in FIG. 1, the wet palette includes a flat container 1 having a peripheral rim which, in its operational state, contains water 4. A retaining structure 2 for the water 4, preferably a flat sponge or foam, is placed in the flat container 1 to become impregnated and moisten by contact and absorption of the water 4 contained in the flat container 1. A sheet of paper 3 permeable to water is positioned on the retaining structure 2. In the operational state of the palette, the sheet of paper 3 is in contact with a water-based paint 5, for example an acrylic paint, which is applied to the upper side of the sheet of paper 3. One will therefore understand that the sheet of paper 3 acts here as moistening support making it possible to maintain the paint 5 in a moist state, while avoiding direct contamination by the paint 5 of the retaining structure 2.

According to the invention, the sheet of paper 3 is a sheet of one-side coated paper, or "C1S" paper, which is wet-strengthened (REH), whose coated upper side is exploited, in its operational state, as a support for the application of the water-based paint 5. As already mentioned, this particular type of paper is known and available on the market, however for a completely different application, namely the labeling of glass containers or metal, especially glass bottles. The use of such wet-strengthened, one-side coated (C1S) paper as moistening support for a wet palette has not, to the Applicant's knowledge, been previously described or suggested in the state of the art.

In the illustrated example, it will be understood that the retaining structure 2 is saturated with water 4 by capillarity, and that the water passes through the sheet of paper 3 and hydrates the paint 5, here of the acrylic type. The paint is therefore kept wet in the "open sky" during the painting session, which allows it to be used for more than a few hours.

The use, according to the invention, of a sheet of wet-strengthened (REH), one-side coated (C1S) paper as moistening support for the wet palette offers the advantage that the sheet of paper 3 has a coating, on its upper side, intended to receive the water-based paint 5 and whose water permeability is comparatively less than the water permeability of the base of the sheet of paper 3 which is positioned in contact with the retaining structure 2. In addition, the coating offers a good degree of impermeability to the pigments contained in the water-based paint 5. This therefore results in a directional structure which ensures, on the one hand, good wetting of the paint 5 and prevents, on the other hand, the penetration of the pigments contained in the paint 5 into the sheet of paper 3, thus preventing the soiling of this sheet of paper 3 and of the retaining structure 2 lying underneath.

It turns out that the wet-strengthened (REH), one-side coated (C1S) paper is particularly suitable insofar as it also makes it possible to carry out a possible cleaning of the upper side of the sheet of paper 3 at the end of the painting session, and therefore reuse of the sheet of paper 3, increasing the life of the sheet of paper 3 accordingly.

Preferably, the sheet of paper 3 is provided with such a permeability of the coating making it possible to work with paints 5 with very fine particles and pigments. In this context, the coating may in particular have a microporous structure which makes it possible to limit the absorption of the paint 5 and of the pigments in the paper, while allowing moisture to pass.

Ideally, the sheet of paper 3 has a wet opacity (measured according to ISO standard 2471) that is greater than 80% so that moisture does not negatively affect the visual appearance of the sheet of paper 3.

The retaining structure 2 can advantageously be a smooth foam or a smooth sponge, in particular a polyvinyl alcohol (PVA) foam or a polyurethane foam, limiting the development of molds. An antifungal treatment of the sheet of paper 3 is in this respect also possible, even advisable.

The retaining structure 2 and the sheet of paper 3 preferably have identical shapes. In particular, the retaining structure 2 and the sheet of paper 3 can advantageously be embossed so as to create hydrating basins arranged to receive a paint 5, in particular liquid.

In contact with water, ordinary paper relaxes and warps. It becomes relatively brittle and crumbles over time. Small pieces of paper can end up in the paint. The sheet of paper 3 according to the invention makes it possible to avoid these drawbacks. A thin, uncoated sheet of paper would allow paint to penetrate, which would damage the retaining structure. According to the invention, the sheet 3 is made of a wet-strengthened (REH) paper in order to prevent the sheet of paper 3 from tearing and disintegrating in the water, which would render it unusable. This wet strength (REH) can be achieved during the manufacture of the paper by the incorporation of reinforcing fibers, for example synthetic, or by the addition of additives of the polyamide-amine-epichlorohydrin (PAE) type.

It is advantageous to use paper whose weight (defined according to ISO standard 536) is between 30 g/m$^2$, or even 50 g/m$^2$, and 100 g/m$^2$, depending on the paint 5 used. The upper side of the sheet of paper 3 is moreover printable, which in particular allows the possible printing of guides or patterns.

According to a particularly preferred embodiment variant, the sheet of one-side coated (C1S) paper has a COBB60 absorption index (measured according to ISO standard 535) on the side of its uncoated lower side which is between 10 g/m$^2$ and 25 g/m$^2$, as well as a dry tensile strength (measured according to ISO standard 1924-2) which is between 50 N/15 mm and 100 N/15 mm.

The sheet of one-side coated (C1S) paper can more particularly be, in a first embodiment variant, a sheet of machine-finished coated paper, or "MFC" paper. An example of such a machine-finished coated paper is for example marketed by company Feldmuehle GmbH (www.feldmuegle-uetersen.com) under the designation SaxaSet® with a grammage of 70, 75 or 80 g/m$^2$ (SaxaSet® being a registered trademark of Feldmuehle GmbH).

The sheet of one-side coated (C1S) paper can alternatively be, in a second embodiment variant, a sheet of cast-coated paper, or "coated on chrome" paper, namely a paper whose coating is carried out by means of a polished chrome-plated cylinder which gives the coating greater shine and a smooth surface. An example of such a cast-coated paper is for example marketed by Zanders Paper GmbH (www.zanders.com) under the designation Chromolux® 900 E with a grammage of 80 or 90 g/m$^2$ (Chromolux® being a registered trademark of Zanders Paper GmbH). This paper also has the advantage of being a wood-free paper, with high whiteness and good gloss on the coating side (namely a whiteness of around 89% according to ISO standard 2469 and a gloss greater than 57% according to ISO standard 8254-2), and which does not yellow and offers good robustness in use.

The above examples of wet-strengthened (REH), one-side coated (C1S) papers are given for illustrative purposes and other papers of similar categories (machine-finished coated or cast-coated) could be used, in particular depending on the properties of the water-based paint 5 used.

If necessary, the underside of the sheet of paper 3 could be additionally treated or coated with a light coating in order to stabilize the sheet of paper (and avoid for example a rolling up on itself or a stretching of the sheet of paper 3, in particular because of a differentiated absorption between the lower and upper sides) and/or in order to adjust the level of water absorption of the sheet of paper 3.

Of course, the wet palette according to the invention can also comprise a lid or other similar element making it possible to enclose the paint 5 hermetically outside the periods of the painting sessions when the artist is not painting.

It will generally be understood that various modifications and/or improvements obvious to those skilled in the art can be made to the embodiments described in the present description without departing from the scope of the invention defined by the appended claims.

In particular, the sheet of paper 3 can optionally be treated or coated with a light coating on its underside in order to adjust, if necessary, the degree of water absorption of the sheet of paper 3 and therefore the degree of moisture of this sheet, without this affecting the properties of the coating applied to the upper side where the paint is applied.

Finally, although reference has been made to the use of an acrylic paint, the wet palette according to the invention can be used together with any other type of water-based paint, in particular but not exclusively gouache or watercolor.

The invention claimed is:

1. A wet palette for water-based paint including:

a flat container having a peripheral rim and which, in its operational state, contains water;

a retaining structure for the water which is placed in the flat container and arranged to become impregnated and moisten by contact and absorption of the water contained in the flat container; and a sheet of paper permeable to the water, positioned on the retaining structure, and which, in its operational state, is in contact with water-based paint applied to an upper side of the sheet of paper, wherein the sheet of paper is a sheet of one-side coated (C1S) paper, which is wet-strengthened, a coated upper side of which is exploited, in its operational state, as a support for the application of the water-based paint, wherein the sheet of one-side coated (C1S) paper is a sheet of machine-finished coated (MFC) paper or a sheet of cast-coated paper, and wherein the sheet of one-side coated (C1S) paper has a COBB60 absorption index measured according to ISO standard 535 on a lower side of the sheet of paper which is between 10 $g/m^2$ and 25 $g/m^2$, as well as a dry tensile strength measured according to ISO standard 1924-2 which is between 50 N/15 mm and 100 N/15 mm.

2. The wet palette according to claim 1, wherein the sheet of one-side coated (C1S) paper has a grammage defined according to ISO standard 536 which is comprised between 30 $g/m^2$ and 100 $g/m^2$.

3. The wet palette according to claim 2, wherein the sheet of one-side coated (C1S) paper has a grammage defined according to ISO standard 536 which is comprised between 50 $g/m^2$ and 100 $g/m^2$.

4. The wet palette according to claim 1, wherein the sheet of one-side coated (C1S) paper is a sheet of wood-free paper.

5. The wet palette according to claim 1, wherein the retaining structure (2) is a foam or a sponge.

6. The wet palette according to claim 5, wherein the retaining structure is a smooth foam or sponge.

7. The wet palette according to claim 5, wherein the retaining structure is a polyvinyl alcohol (PVA) foam or a polyurethane foam.

8. The wet palette according to claim 1, further comprising a lid arranged to be placed on the flat container and enclose the retaining structure as well as the sheet of paper to preserve the paint between various painting sessions.

9. A method of implementing the wet palette for water-based paint according to claim 1, comprising the following steps:

pouring water into the flat container then placing the retaining structure for the water in the flat container, or vice versa, the retaining structure becoming impregnated and moistening by the contact and absorption of the water contained in the flat container;

placing the sheet of paper permeable to the water on the retaining structure such that the coated upper side of the sheet of paper is exploited as a support for the application of water-based paint; and applying the water-based paint on the coated upper side of the sheet of paper.

10. A method of using a sheet of paper as moistening support of a wet palette for water-based paint, wherein the sheet of paper is a sheet of one-side coated (C1S) paper, which is wet-strengthened (REH), a coated upper side of which is exploited, in its operational state, as a support for the application of the water-based paint, wherein the sheet of one-side coated (C1S) paper is a sheet of machine-finished coated (MFC) paper or a sheet of cast-coated paper, and wherein the sheet of one-side coated (C1S) paper has a COBB60 absorption index measured according to ISO standard 535 on the side of its lower side which is between 10 $g/m^2$ and 25 $g/m^2$, as well as a dry tensile strength measured according to ISO standard 1924-2 which is between 50 N/15 mm and 100 N/15 mm.

11. The method according to claim 10, wherein the sheet of one-side coated (C1S) paper has a grammage defined according to the ISO standard 536 which is comprised between 30 $g/m^2$ and 100 $g/m^2$.

12. The method according to claim 11, wherein the sheet of one-side coated (C1S) paper has a grammage defined according to the ISO standard 536 which is comprised between 50 $g/m^2$ and 100 $g/m^2$.

13. The method according to claim 10, wherein the sheet of one-side coated (C1S) paper is a sheet of wood-free paper.

14. The method according to claim 10, wherein the water-based paint is acrylic paint, gouache, or watercolor.

* * * * *